(12) United States Patent
Talwar et al.

(10) Patent No.: US 8,185,913 B1
(45) Date of Patent: May 22, 2012

(54) MANAGEABILITY PLATFORM IN AN UNIFIED SYSTEM

(75) Inventors: Vanish Talwar, Palo Alto, CA (US); Parthasarathy Ranganathan, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1330 days.

(21) Appl. No.: 11/888,343

(22) Filed: Jul. 31, 2007

(51) Int. Cl.
*G06F 9/44* (2006.01)
*G06F 9/455* (2006.01)

(52) U.S. Cl. ............. 719/319; 718/1; 719/318; 719/328

(58) Field of Classification Search ...... 718/1; 719/318, 719/319, 328
See application file for complete search history.

(56) References Cited

U.S. PATENT DOCUMENTS

| | | | |
|---|---|---|---|
| 5,619,726 A | 4/1997 | Seconi et al. | |
| 7,334,086 B2 | 2/2008 | Hass et al. | |
| 7,424,711 B2 * | 9/2008 | Schluessler et al. | 718/100 |
| 7,694,159 B2 * | 4/2010 | Cepulis | 713/310 |
| 7,702,966 B2 * | 4/2010 | Chandwani et al. | 714/47 |
| 7,805,734 B2 * | 9/2010 | McKinley | 719/328 |
| 2005/0160423 A1 * | 7/2005 | Bantz et al. | 718/1 |
| 2006/0107311 A1 | 5/2006 | Dawson et al. | |
| 2007/0104452 A1 | 5/2007 | Wang et al. | |
| 2008/0154985 A1 * | 6/2008 | Childs et al. | 707/204 |

* cited by examiner

*Primary Examiner* — Charles E Anya

(57) ABSTRACT

An unified system that comprises a host system platform that includes a host operating system, a host processor that operates to execute host system applications within the host OS. The unified system also includes a manageability platform dedicated to performing manageability operations to manage the host system platform and includes, a manageability OS, a manageability processor dedicated to execute the manageability operations within the manageability OS, wherein the manageability processor is a general-purpose processor, an automation engine integrated in the manageability platform and executed by the manageability processor to perform the manageability operations, and a plurality of interfaces that provide the manageability processor with access to the host system platform to support the performance of the manageability operations.

17 Claims, 7 Drawing Sheets

MANAGEABILITY PLATFORM IN AN UNIFIED SYSTEM

RELATED APPLICATIONS

This application is related to U.S. patent application Ser. No. 11/888,349, filed on Jul. 31, 2007, and entitled, "SYSTEMS AND METHODS FOR EXCHANGING RUNTIME FUNCTIONALITIES BETWEEN SOFTWARE STACKS" and U.S. patent application Ser. No. 11/888,348, filed on Jul. 31, 2007, and entitled, "STORAGE-CENTRIC MANAGEABILITY IN A SYSTEM", which are herein incorporated by reference in their entireties.

BACKGROUND

Manageability is a key requirement for a broad spectrum of information technology (IT) systems ranging from laptops to blade servers to clusters to large scale data centers. With rising complexity and scale in tomorrow's enterprise IT, systems management has become a dominating cost. As referred herein, manageability includes management and maintenance tasks or operations. As also referred herein, and as understood in the art, information technology, or IT, encompasses all forms of technology, including but not limited to the design, development, installation, and implementation of hardware and software information or computing systems and software applications, used to create, store, exchange and utilize information in its various forms including but not limited to business data, conversations, still images, motion pictures and multimedia presentations technology and with the design, development, installation, and implementation of information systems and applications. Thus, examples of IT management and maintenance tasks or operations include diagnostics and recovery, security protection, backups, resource provisioning, and asset management of IT systems.

At a broader level, the scope of IT manageability may be associated with the lifecycle phases for servers and data centers, including bring up, operation, failures/changes, and retire/shutdown phases. Various tasks are performed at each of these life cycle stages. Examples include systems, security protection against viruses and spyware, backup protection against disasters, disk maintenance to improve performance, fault diagnostics and recovery, and asset management to track resources. Currently, there are several efforts underway to address this growing problem of manageability. For example, software based solutions have been proposed to address manageability at the different lifecycle phases. In such solutions, several of the manageability tasks execute during the operation phase of the servers, sharing hardware and software resources with host applications. This sharing leads to resource interference and hence degradation in performance. Such degradation is expected to worsen with growing IT complexity and corresponding increases in the growing number and sophistication of manageability tasks.

One approach to address the above concerns is to provide better platform support for manageability tasks. An emerging trend towards this direction is the use of manageability processors (MPs)—dedicated hardware processors that only execute manageability tasks and provide an out-of-band channel for remote management. A typical MP is a small embedded application-specific integrated circuit (ASIC) customized for specific manageability uses or operations. It can be hooked off, for example, the peripheral component interconnect (PCI) bus at an input/output (I/O) bus (e.g., the southbridge) of computerized systems such as servers and personal computers (PCs). Instantiations of such MP architectures or platforms follow an asymmetrical model. The host system includes a powerful processor or central processing unit (CPU), large memory, network interface cards or modules (NIC), a server operating system (OS), while the manageability system includes a cheaper embedded processor, a small dedicated memory, NIC, and a private embedded OS that executes independently of the host system. Such asymmetry and independence aids in removing resource interference for processors, buses, caches, and memory, thereby resulting in improved performance for host workloads that are CPU and memory bound.

BRIEF DESCRIPTION OF THE DRAWINGS

Embodiments are illustrated by way of example and not limited in the following figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Existing manageability processor (MP) architectures or platforms, as discussed earlier, have several limitations. For example, they support limited manageability functionality and have non-standard interfaces. Additionally, there is an inefficient separation of capabilities between existing hardware and software IT manageability solutions that create islands of disjoint management efforts. Furthermore, existing IT manageability solutions are not fully automated, thereby resulting in higher total cost of ownership of IT systems.

Accordingly, described herein are methods and systems for providing an extensible unified architecture for a manageability processor in a host system such as a computerized system. Such an architecture includes a powerful manageability platform that supports general-purpose service processors, an operating system (OS) stack embedded in the manageability platform, an automation engine with rich policy and model stacks that is integrated in the manageability platform, and rich interfaces between the manageability platform and the rest of the host system to provide dedicated control paths to other aspects of the host system. Consequently, the various embodiments of an extensible unified manageability architecture as described herein enable a much richer set of management capabilities through good coordination among the software- and hardware-based manageability solutions so as to provide an efficient integration of manageability functionalities and a better utilization of available management capabilities for manageability, including new applications in diagnostics, asset management, resource provisioning, and security management.

Figure 1:
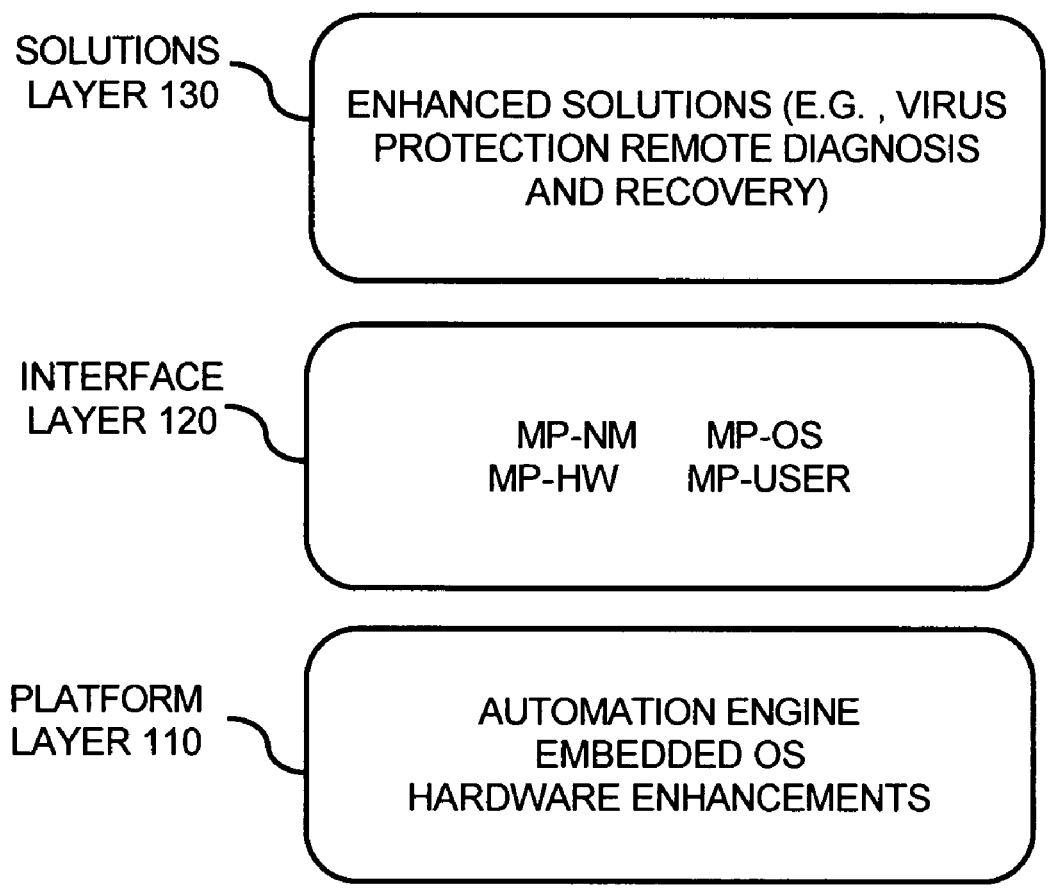
FIG. 1 illustrates a conceptual block diagram of a manageability platform in accordance with one embodiment.

FIG. 1 illustrates a conceptual block diagram of a manageability platform 100 in accordance with one embodiment. The manageability platform 100 includes three layers to provide such a platform with hardware, operating system, and management software aspects. The three layers are a platform layer 110, an interfaces layer 120, and a solutions layer 130, as further described below.

The platform layer 110 includes hardware enhancements, an automation engine, and an embedded OS. For hardware enhancements, instead of conventionally implementing the MP as an ASIC with specific purposes, a general purpose processor is implemented as the MP in the manageability platform 100. The general purpose processor may be a CPU or any other multi-purpose processor or microprocessor. Examples of a general purpose processor include a processor of any of a number of computer processors, such as processors from Intel, AMD, and Cyrix. It should be noted that although the MP is implemented by a general-purpose processor, its specific purpose is to manage a host system in which it is implemented or embedded. That is, the MP is dedicated to performing manageability tasks for management of the host system. The hardware enhancements in the platform layer 110 of the manageability platform 100 also include dedicated control paths from the MP to the data storage subsystem, such as a disk storage subsystem, of the host system. This enables data-centric tasks or operations to be delegated to the MP. The implementation of the MP as a general-purpose processor with enhanced processing capabilities, in turn, allows implementation of an embedded OS with an enhanced OS stack at the platform layer 110 with richer semantics for file system support and web-services support.

The interfaces layer 120 provides a bridge between: a) the MP and the OS the host system (MP-OS) to coordinate various runtime structures and the execution of manageability tasks or operations; b) the MP and the user (MP-user) to provide richer command line interfaces to the end-user based on standards such as systems management architecture for server hardware (SMASH) to enable to the user to remotely access the MP; c) the MP and the hardware of the host system (MP-HW) to directly access such hardware to perform manageability tasks; and d) the MP and any available software-based management solutions (MP-NM), such as a data center management software, to send notification events to and exchange data with such management solutions, using any available software management model such as the common information model (CIM).

The solutions layer 130 provides manageability solutions with enhanced functionality via manageability applications hosted by the manageability platform 100 and executed by the MP therein. As discussed earlier, Examples of manageability applications include provisioning and installation of servers, monitoring performance and health of systems, security protection against viruses and spyware, backup protection against disasters, disk maintenance to improve performance, fault diagnostics and recovery, and asset management to track resources.

The manageability platform 100 is extensible to provide a combined hardware and software platform for use in a host system ranging from a single server or a mainframe computer to a rack enclosure with multiple blade servers to large scale data centers with multiple rack enclosures with multiple blade servers therein. For example, in a single computer or server, the platform layer 110 includes the use of a general-purpose processor as a MP with an embedded OS and an automation engine in the server. In another example, for a rack enclosure with multiple blade servers, the platform layer 110 is extended to include the use of a general-purpose processor as a MP, an embedded OS, and an automation engine in each of the blade servers or the use of one MP, one embedded OS, and one automation engine for the entire rack enclosure. In a further example, for a data center with multiple rack enclosures, the platform layer 110 is further extended to include one or more MPs, embedded OS'es, and automation engines for use in each rack enclosure, and a master MP, a master embedded OS, and a master automation engine may be used for the entire data center. Accordingly, such an extensible platform layer 110 is operable to support virtual machine (VM) architectures wherein each VM acts like a single system, and overlay architectures wherein a peer-to-peer (P2P) layer or an overall management layer (e.g., an overall data center layer) is provided over multiple systems. Extensible interfaces layer 120 and solutions layer 130 are then provided to the extensible platform layer 110.

Figure 2:
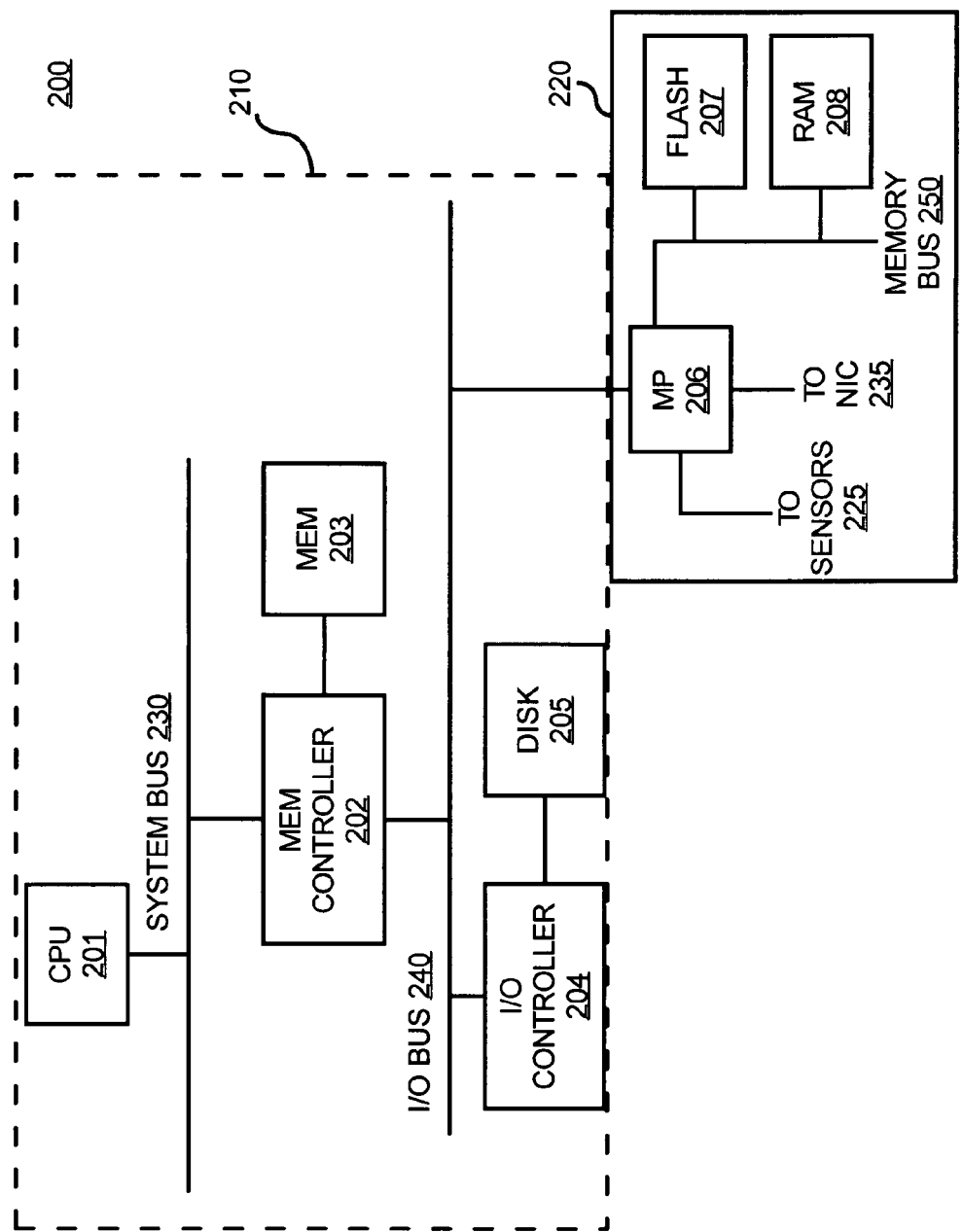
FIG. 2 illustrates a hardware block diagram of an unified system operable for implementation of a manageability platform therein, in accordance with one embodiment.

FIG. 2 illustrates a hardware block diagram of an unified system 200 with implementation of a manageability platform therein. The unified system 200 includes a host system platform 210 and a manageability platform 220. The host system platform 210 includes one or more host processors, such as processor 201, for executing host system software stored in a main memory device 203, a secondary memory device 205, or both. Examples of host system software include a host system OS, file system, drivers for host software and hardware components, and any other software applications installed in the secondary memory device 205 for execution within the host OS. Thus, the host system platform 210 includes one or more host processors of any of a number of computer processors, such as processors from Intel, AMD, and Cyrix. As referred herein, the host processor 201 may be a general-purpose processor, such as a central processing unit (CPU) or any other multi-purpose processor or microprocessor. The host processor 201 also may be a special-purpose processor, such as a graphics processing unit (GPU), an audio processor, a digital signal processor, or another processor dedicated for one or more processing purposes other than manageability purposes in the host system platform 210. Also, although only one CPU is illustrated, it should be understood that the host system may include a signle-core CPU, a homogeneous multi-core CPU or processor (where the cores are the same), a heterogeneous multi-core CPU or processor (where the cores are different) or a multi-socket CPU configuration that includes multiple CPUs operating therein.

Commands and data from the host processor 201 are communicated over a system bus 230 with other components in the unified system 200, such as one or more memory controllers like the memory controller 202 that handle communication between the host processor 201 and the main memory device 203, where software is resident during runtime. The main memory device 203 is typically a semiconductor memory chip such as a random access memory (RAM) module, although any other suitable type of memory device, such as an optical or magnetic memory device, is operable as the main memory device 203 as well.

The host system platform 210 also includes an I/O controller 204 that handles communication to and from one or more secondary memory devices, such as the secondary memory device 205, where host system software is installed for execution by the host system platform 210. The second memory device 205 is typically a storage drive such as a magnetic hard disk or tape drive, an optical disk drive, although any other suitable type of memory device such as a semiconductor memory device (e.g., flash memory) is operable as the secondary memory device 205 as well. Commands and data to and from the I/O controller 204 are communicated over an I/O bus 240 with other components in the unified system 200, such as the memory controller and the manageability platform 220. Because it is desirable to have a common manageability solution across different kinds of systems, adding the manageability platform 220 at the I/O bus 240 enables portability of such a platform across multiple vendors. Additionally, a number of commercially-available servers include small embedded ASICs at the I/O bust level that provide limited manageability functions like remote power on. Enhancing those ASICS to be general-purpose processors or controllers is often more cost effective than adding a new processor core or an all new processor.

The manageability platform 220 includes a MP 206 dedicated to perform manageability tasks to manage the unified system 200. As discussed earlier, a general-purpose processor is used to implement the MP 206. Compared to the host processor 201, the MP 206 may be a smaller (embedded) processor. Consequently, the unified architecture for the unified system 200 is more power efficient compared to traditional approaches. Isolating the two processors also provide greater opportunity for dynamic power control techniques like voltage and frequency scaling. As with the host system platform 210, the manageability platform 220 includes a first memory device 207 and a second memory device 208. Commands and data from the MP 206 are communicated over a memory bus 250 with the first and second memory devices 208. In one example, the first memory device 207 is a flash memory that maintains the firmware for the manageability platform 220 and the MP 206, and the second memory device 208 is a RAM, such as a SDRAM, where manageability software or application is resident during runtime. The manageability platform 220 also includes new hardware interfaces to provide control and data paths from the MP 206 to other parts of the unified system 200 such as sensors, storage, and network. For example, as illustrated in FIG. 2, the MP 206 includes a hardware interface 225 to sensors such as power consumption and temperature sensors, a hardware interface 235 to a separate network port such as a network interface card (NIC) to the host OS and software (not shown), and a hardware interface to the I/O bus 240 to provide access to storage such as the disk memory device 205 via the I/O controller 204. In one embodiment, the manageability platform is separately powered from the host system platform 210 so as to provide two separate power domains in the unified system 200.

Separation of the manageability and host application domains have several advantages. First, system administrators often prefer additional control on manageability applications to have stricter controls on disabling or changing parameters. For example, disabling virus scanning to improve performance might be disastrous. Second, from a fault tolerance perspective, having separate hardware fault domains for the manageability and host processing provides valuable benefits, such as isolating failures due to software errors, hardware errors, security attacks so that these failure do not spread from one domain to another. Furthermore, having the manageability platform 220, and the MP 206 therein, in a separate power domain has additional value. For example, manageability applications such as disk indexing or virus scanning are executable even when the host system is not running.

Figure 3:
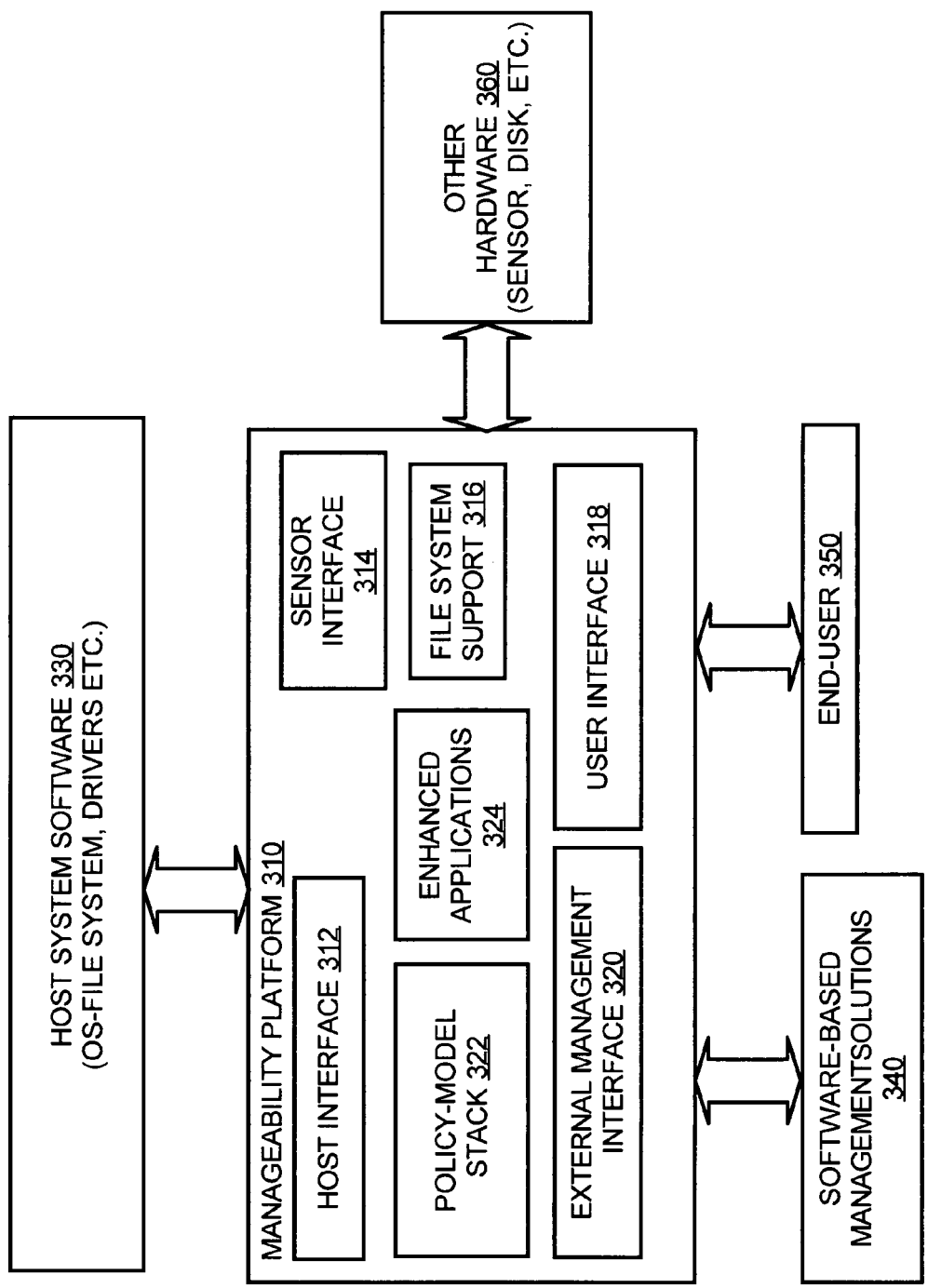
FIG. 3 illustrates a block diagram of the software components implemented in a manageability platform within a system, in accordance with one embodiment.

FIG. 3 illustrates a block diagram 310 of the software components implemented in the manageability platform 220 to provide further details of the automation engine and software interfaces that the manageability platform 220 employs to provide manageability of the computer 200. The block diagram 310 includes the following software components: a host interface 312, a sensor interface 314, a file system support interface 316, a user interface 318, and an external management interface 320. The block diagram 310 also includes an automation engine as represented by the policy-model stack 322 and software-based manageability solutions with enhanced functionality as represented by the enhanced applications 324. These software components may be implemented as firmware or software installed in the FLASH memory 207 for execution by the MP 206 within an OS of the manageability platform 220 (not shown). Having a separate OS stack in the manageability platform 220 eliminates software level contention. This allows for a more powerful automation engine that can enable more intelligent arbitration between the host applications and manageability applications to improve performance. Also, there are several benefits from the perspective of the manageability application. First, given its own local processing, many tasks may now be run at any time and all the time in the background without having to deal with issues around contention. For applications like security or data integrity, this is an important issue. Second, the proximity of the MP 206 to the storage subsystem (e.g., disk memory device 205) potentially reduces the I/O latency, further improving the performance.

The host interface 312 includes one or more application programming interfaces (APIs) that enable the manageability platform 220 to access the host system software 330, including the host OS stack such as OS file system, OS drivers, etc., to coordinate and exchange the various runtime data structures between software stacks to provide semantic interfaces as described in U.S. application Ser. No. 11/888,349 and the execution of manageability tasks. These APIs also enable the manageability platform 310 to access the OS and applications logs in the host system software 330, which are useful for manageability solutions such as remote diagnostics. Such APIs may be provided or exposed by the host system software 330 through software development kits. Although the host system software 330 is described as including an OS stack, it should be understood that the host system software 330 may include a hypervisor stack for hosting virtual machines, or any other OS-like stack for operating a device. Likewise, the manageability platform 310 may be implemented within a hypervisor.

The sensor interface 314 includes one or more device drivers that are operable to access the sensors and other desired hardware devices (block 360) in the unified system 200.

The file system support 316 provides support for the manageability platform 310 to access data storage areas in the unified system 200 in a manner consistent with the particular file system(s) used in such data storage areas.

The user interface 318 includes one or more interfaces that allow an end user 350 of the unified system 200 to remotely access the manageability platform 220 and the MP 206 therein. For example, the user interface 318 includes command line interfaces to the end user 350 based on standards such as systems management architecture for server hardware (SMASH) to enable to the end user 350 to remotely access the manageability platform 220 and the MP 206 therein.

The external management interface 320 to the external software-based management solutions 340 (e.g., network management of a data center) relies on exchange of data (e.g., notification events) using any IT management modeling standard. For example, the CIM as defined and published by the Distributed Management Task Force (DMTF) may be employed for the interface 320. By representing software components as CIM objects in CIM and by using SMASH managed element addressing which leverages web services, manageability operations may be passed to the appropriate component (software or hardware) without requiring explicit knowledge of the component except for where it resides.

The enhanced applications 324 are manageability applications with enhanced functionalities that may be embedded in the manageability platform 310 to take advantage of the increased processing capabilities of the MP 206, which is now a general-purpose processor, the local automation capabilities provided by the policy-model stack 322, and the various interfaces 312-320. Delegating the manageability applications to a dedicated MP eliminates resource contention and interference at all higher levels of the unified system 200, including at the thread level, at the shared caches' level, and at the memory/system bus level.

The policy-model stack 322, which may be implemented at the firmware level of the manageability platform 220, includes a policy stack and a model stack. The policy stack expresses obligation policies of the manageability applications as hosted by the manageability platform 220. Obligation policies specify actions to be performed when certain events happen. For example, security management policies specify what actions must be specified when security violations occur and who must execute those actions. In another example, performance management policies could relate to tuning actions. In still another example, fault management policies could have actions specified to re-configure or restart components. Obligation policies are event-triggered; examples of events are internal timer events, or an external event notified by monitoring service components e.g. a temperature exceeding a threshold or a component failing. Composite events are also possible. Obligation policies can be expressed as reactive rules by using the format: ON (event) IF (condition is satisfied) THEN (trigger actions)." Obligation policies may be application-specific to specify pre-defined policies for performing particular manageability tasks or applications. Alternatively, they may be application-agnostic to specify pre-defined policies that are applicable to all manageability tasks or applications.

The model stack portion of the policy-model stack 322 captures information obtained by the manageability platform 310 from interfaces 312-320. For example, the model stack is used to capture information such as machine status and health in a formal structured manner.

Figure 4A:
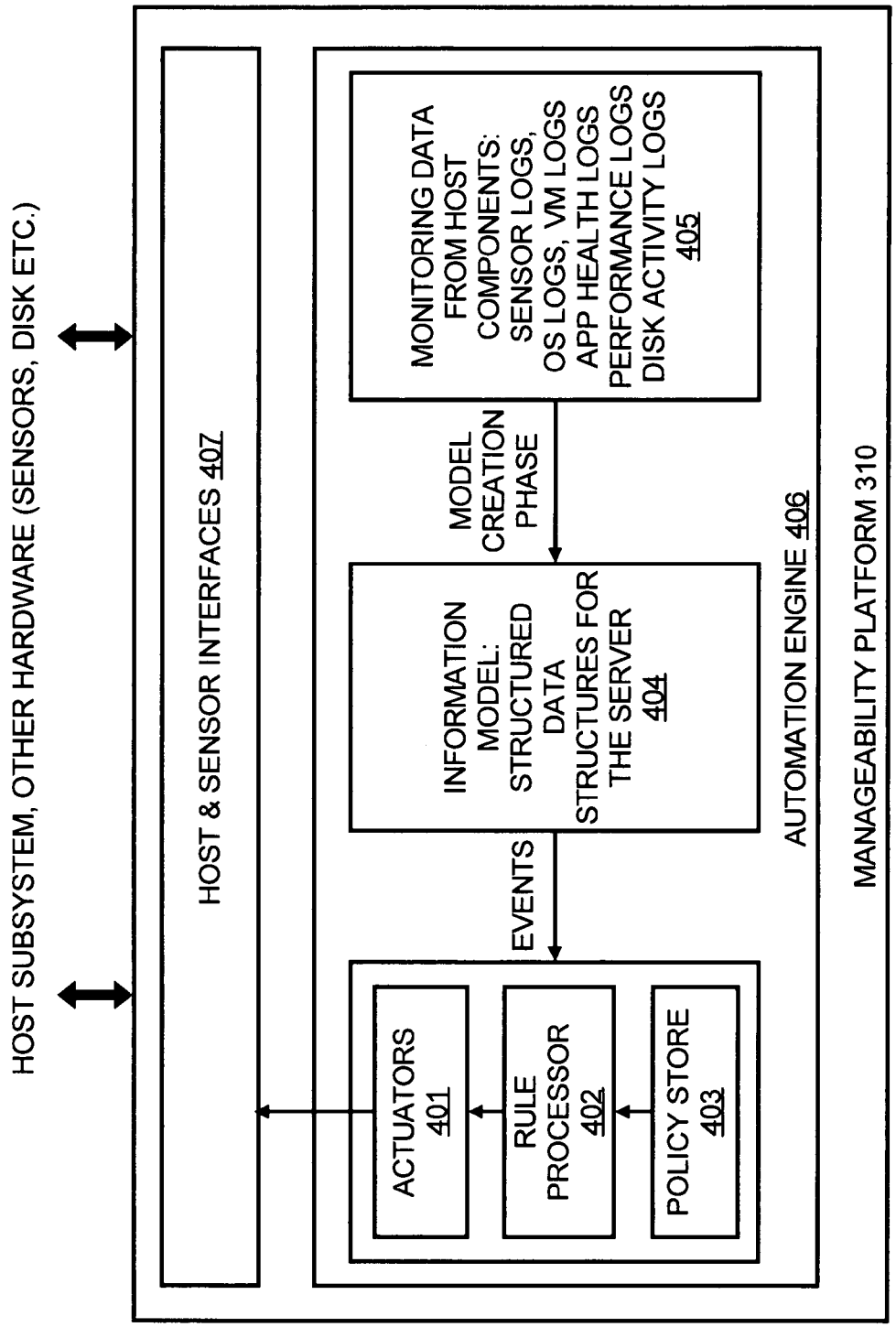
FIGS. 4A-B illustrate a block diagram of the automation engine, in accordance with one embodiment.
Figure 4B:
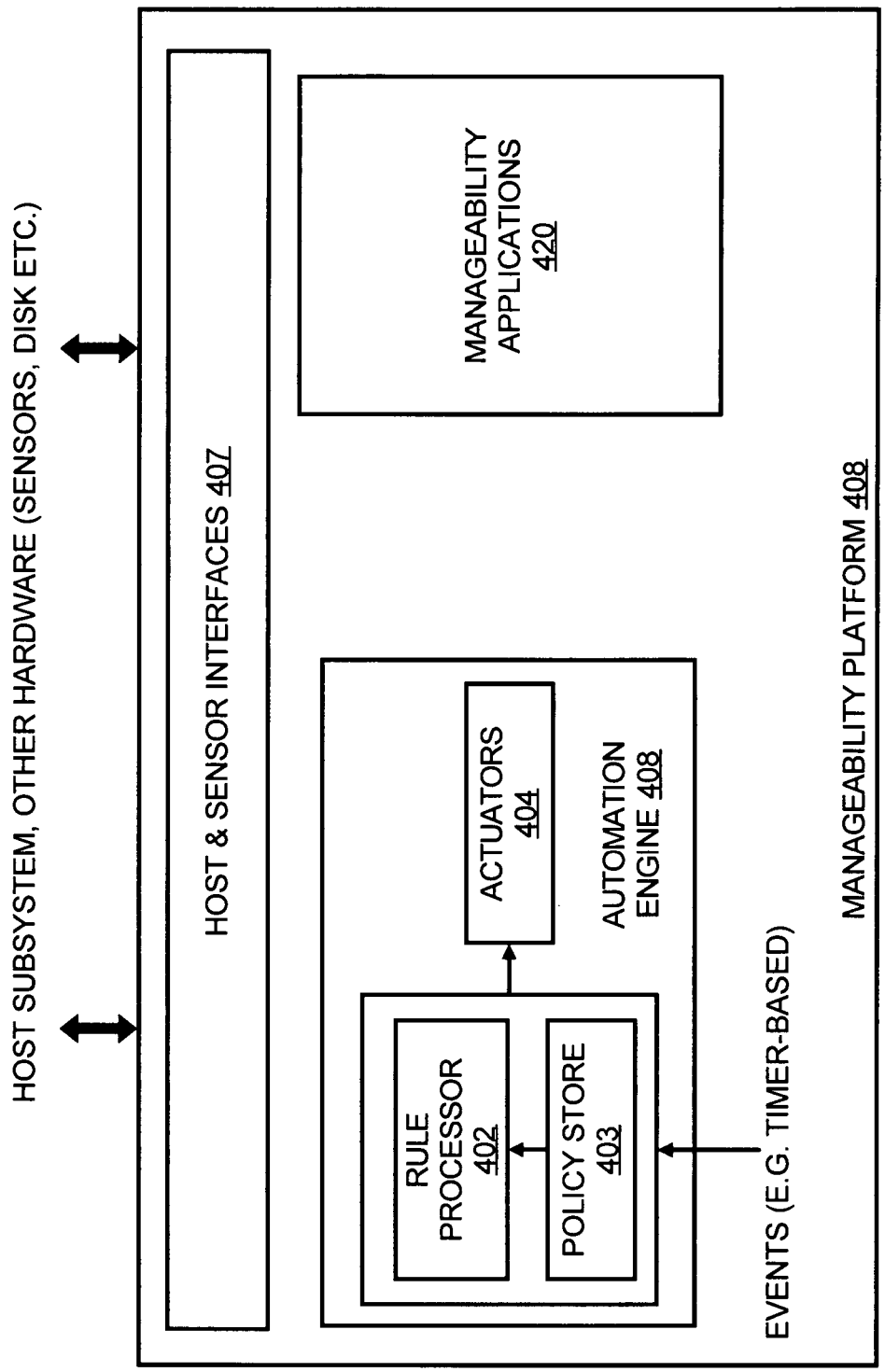

FIGS. 4A-4B illustrate a block diagram of an automation engine 406 in the manageability platform 310 that implements the policy-model stack 322 to capture, for example, monitoring data from the host system components. Examples of monitoring data include but are not limited to sensor logs from the hardware 360, OS logs from the host system software 330, virtual machine (VM) logs when the host system runs virtual machines, application health logs, performance logs, and disk activity logs. The model stack is represented by the information model 404, which provides a model to capture information in formal data structures. Any available information model may be implemented here to providing the modeling. For example, the open-standard common information model (CIM) may be used here. The information model provides the policy stack with event notifications for policy implementation. The policy stack is represented by one or more actuators 401, a rule processor 402, and a policy store 403. The policy store includes obligation policies as described earlier. The rule processor 402 is operable to receive one or more event conditions from the model stack, or information model 404, and apply one or more policies in the policy store 403 in response to such event conditions so as to trigger one or more actuators 401 to execute certain tasks. The actuators 401 are software drivers that actuate components internal to the manageability platform 310, such as the manageability applications 420 (corresponding to the enhanced applications 324), or external to the manageability platform 310 via the host and sensor interfaces 407.

Figure 5:
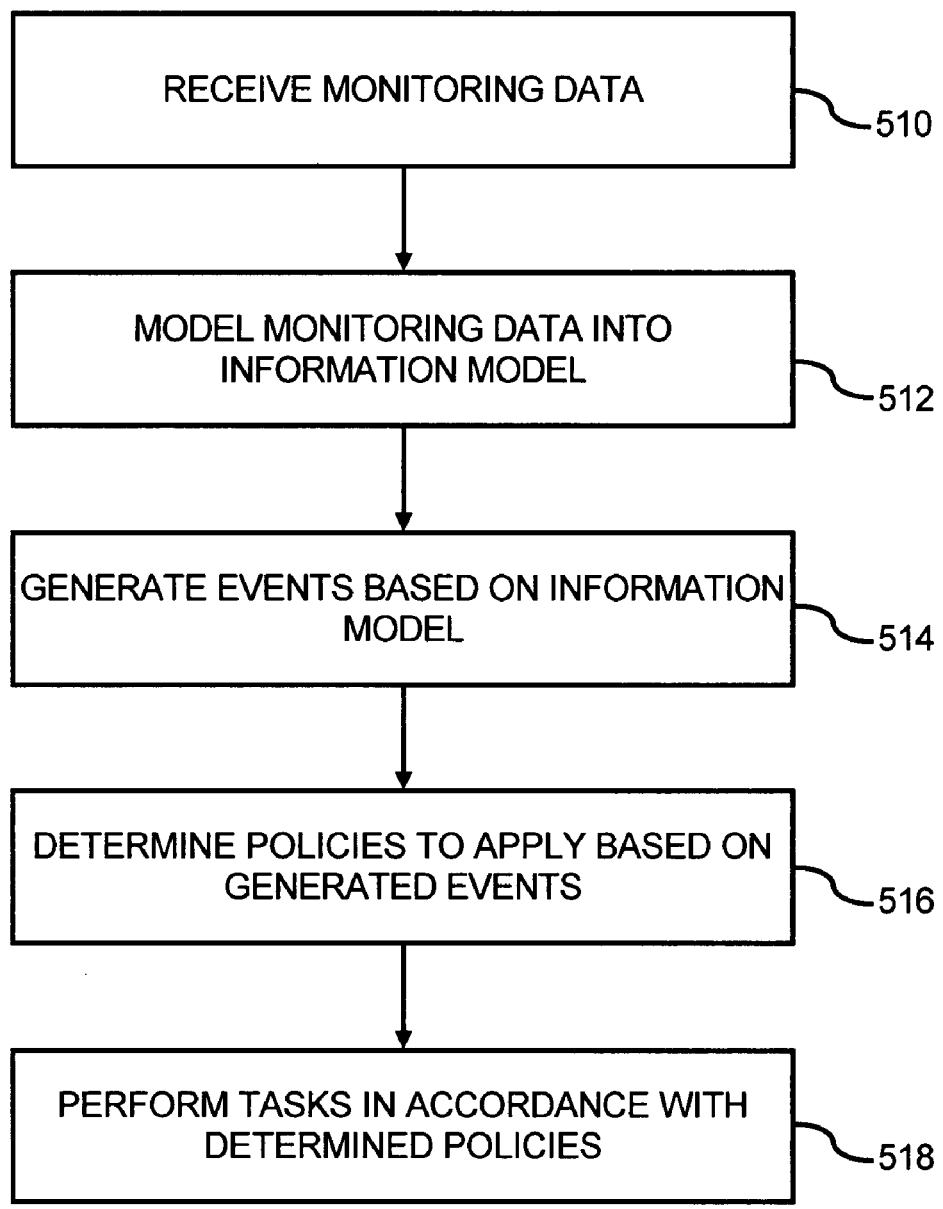
FIG. 5 illustrates a method, in accordance with one embodiment.

FIG. 5 illustrates a decision-flow 600 of the automation engine 406. For illustrative purposes only and not to be limiting thereof, the decision flow 500 is described in the context of FIGS. 4A-4B. At 510, the automation engine 406 receives monitoring data via interfaces 312, 314, 316, 318, and 320 to components external to the manageability platform 310. At 512, the monitoring data is modeled by the model stack, or information model 404, into formal data structures. At 514, the information model generates one or more events based on the modeled data structures. It should be understood from FIG. 4B that events may be triggered or generated by sources other than the information model. For example, the events may be time-based, such as performing a virus scan once a week. At 516, the rule processor 402 receives the generated events and retrieves one or more appropriate policies from the policy store 403 based on the events. At 518, The rule processor 402 then executes the policies to employ the actuators 401 to perform tasks based on the determined policies or accesses the manageability applications 420.

Figure 6:
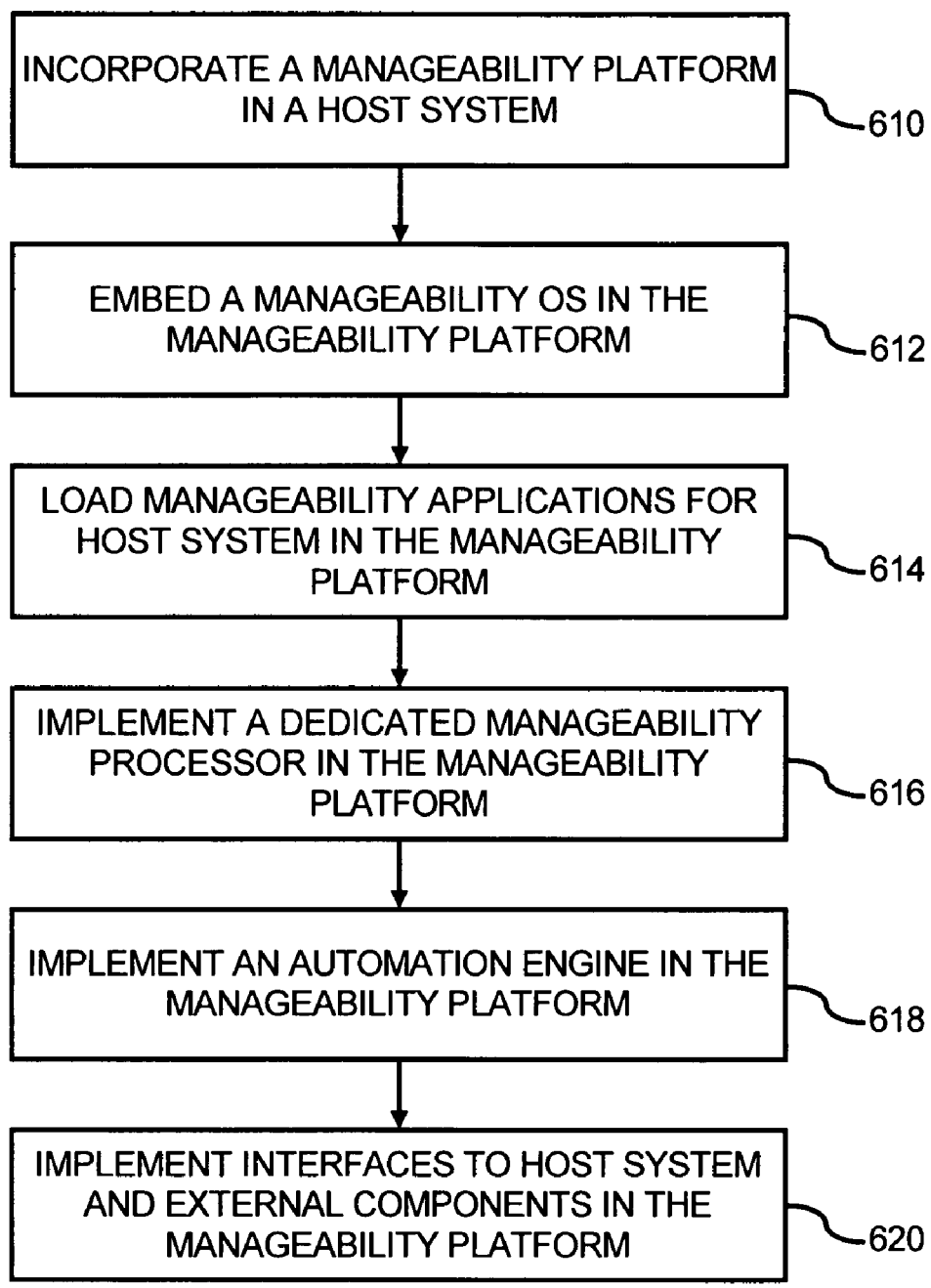
FIG. 6 illustrates another method, in accordance with one embodiment.

FIG. 6 illustrates a method 400 for hosting manageability applications in a host system by delegating such applications to a manageability platform. For illustrative purposes only and not to be limiting thereof, the method 600 is discussed in the context of the unified system 200.

At 610, a manageability platform 220 is incorporated in the host system 200 with connection to the I/O bus of the host system.

At 612, an embedded OS is provided in the manageability platform that is separate from the OS of the host system.

At 614, a plurality of manageability applications are delegated or installed in the manageability platform instead of the conventional loading in the host system for execution by the host processor and host OS.

At 616, a general-purpose processor is implemented in the manageability platform as a MP 206 that is dedicated to the executing the manageability applications.

At 618, an automation engine 322 is implemented in the manageability platform to provide a policy stack to express obligation and reactive policies for the manageability applications and a model stack to capture information such as machine status and health in a formal, structured manner. In one embodiment, the policy and model stacks are integrated into a policy-model stack.

At 420, the a plurality of interfaces are also implemented in the manageability platform to enable the MP 206 to access the rest of the host system 200 and any hardware 360, user 350, and software-based management solutions that are external to the host system 200 to provide manageability of the host system 200.

The aforementioned unified structure for a host system with an embedded manageability platform and a dedicated MP therein enables a richer set of manageability capabilities and functionalities at a lower cost. It also provides possibilities of embedding new software applications, such as those for diagnostics, asset management, resource provisioning, and security management, within the MP. For example, it is possible to run routine management tasks such as virus scanning and backups out-of-band with management platform. In addition, because an integrated policy-model stack is locally provided at the MP, enhanced local automation capabilities are provided that include the ability to enable adaptivity and self-management at the machine level. Furthermore, by providing manageability functions out-of-band on the MP, better performance and power benefits are achievable while leveraging greater security privileges.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. An unified system comprising:
a host system platform that includes,
   a1) a host operating system (OS);
   a2) a host processor that operates to execute host system applications within the host OS; and
a manageability platform dedicated to performing manageability operations to manage the host system platform and includes,
   b1) a manageability OS;
   b2) a manageability processor to execute the manageability operations within the manageability OS, wherein the manageability processor is a general-purpose processor;
   b3) an automation engine integrated in the manageability platform and executed by the manageability processor to perform the manageability operations to manage the host system platform,
      wherein the automation engine includes a policy stack to provide obligation policies that are pre-defined to perform the manageability operations, wherein the obligation policies include reactive, conditional rules, and a model stack to model information monitored by one or more components of the host system platform into data structures, wherein the information model provides the policy stack with event notification for policy implementation; and
   b4) a plurality of interfaces that provide the manageability processor with access to the host system platform to support the performance of the manageability operations.

2. The unified system of claim 1, wherein the host system platform is a hypervisor configured to host one or more virtual machines with the host OS.

3. The unified system of claim 1, wherein the host processor is one of a homogeneous multi-core processor, a heterogeneous multi-core processor, a multi-socket element that includes a plurality of processors, and a single-core processor.

4. The unified system of claim 1, wherein the plurality of interfaces include at least one interface to the host OS to provide the manageability platform with access to the host OS.

5. The unified system of claim 4, wherein the at least one interface to the host OS provides an exchange of runtime data structures between the host OS and the manageability OS.

6. The unified system of claim 4, wherein the at least one interface to a data storage space in the host system platform provides a file-system support for a file system employed by the data storage space.

7. The unified system of claim 6, wherein the manageability operations include one of diagnostics of the unified system, asset management of the unified system, resource provisioning of the unified system, and security management of the unified system.

8. The unified system of claim 1, wherein the plurality of interfaces include at least one interface to a management application external to the unified system to support the execution of the manageability operations by the manageability processor.

9. The unified system of claim 1, wherein the plurality of interfaces include at least one interface to a data storage space in the host system platform to support the execution of the manageability operations by the manageability processor.

10. The unified system of claim 1, wherein the manageability platform is connected to the host system platform at an input/output (I/O) bus level of the host system platform.

11. The unified system of claim 1, wherein the manageability platform is in a different power domain than a power domain of the host system platform.

12. A method for hosting manageability applications in a host system having a host processor and a host operating system (OS), the method comprising:
incorporating a manageability platform in the host system at an input/output bus of the manageability platform;
embedding a manageability OS in the manageability platform that is different from the host OS;
hosting the manageability applications in the manageability platform, the manageability applications operating to manage the host system;
implementing a general-purpose processor as a manageability processor on the manageability platform, the manageability processor is to perform the manageability applications in the manageability OS;
implementing an automation engine in the manageability platform that is executed by the manageability processor to apply obligation policies to each of the manageability applications,
   wherein implementing the automation engine includes providing a policy stack to apply the obligation policies to each of the manageability applications, wherein the obligation policies include reactive, conditional rules, and a model stack to model information monitored by the host system into data structures, wherein the information model provides the policy stack with event notification for policy implementation; and
implementing a plurality of interfaces in the manageability platform that provides access to the rest of the host system to support the execution of the manageability applications.

13. The method of claim 12, wherein providing the plurality of interfaces comprises providing at least one of an interface to a management application external to the host system, an interface to a data storage space in the host system and external to the manageability platform, and an interface to the host OS.

14. A non-transitory computer readable medium on which is encoded programming code executed by a computer processor of a manageability platform to:
implement an automation engine in the manageability platform to perform manageability operations to manage a host system that is isolated from the manageability platform, wherein the host system includes a host operating system (OS) and host computing element;
receive monitored data from the host system;
model, by the automation engine, the monitored data based on an information model into a data structure;
generate an event based on the data structure;
provide, by the automation engine, a policy stack to implement obligation policies for the manageability operations to manage the host system, wherein the obligation policies include reactive, conditional rules and wherein the policy stack and the modeled data structure is implemented at the firmware level of the manageability platform;
determine a policy from the policy stack to apply based on the generated event; and
perform a manageability task to the host system based on the determined policy.

15. The non-transitory computer readable medium of claim 14, wherein the encoded programming code is further executed to:
   generate a second event based on a predetermined trigger.

16. The non-transitory computer readable medium of claim 14, wherein the encoded programming code is further executed to:
   perform a manageability task based on the determined policy by actuating one or more components in the host system.

17. The non-transitory computer readable medium of claim 14, wherein the encoded programming code is further executed to:
   perform a manageability task based on the determined policy by executing one or more manageability applications hosted by the manageability platform that includes a processor separate from the host system.

* * * * *